(12) United States Patent
Fitzgerald

(10) Patent No.: US 10,716,434 B2
(45) Date of Patent: Jul. 21, 2020

(54) SYSTEM FOR CLEANING AND ENCLOSED BAR-B-QUE

(71) Applicant: Richard John Fitzgerald, Lighthouse Point, FL (US)

(72) Inventor: Richard John Fitzgerald, Lighthouse Point, FL (US)

( * ) Notice: Subject to any disclaimer, the term of this patent is extended or adjusted under 35 U.S.C. 154(b) by 205 days.

(21) Appl. No.: 16/031,709

(22) Filed: Jul. 10, 2018

(65) Prior Publication Data

US 2020/0015628 A1   Jan. 16, 2020

(51) Int. Cl.
   *A47J 37/07*   (2006.01)

(52) U.S. Cl.
   CPC ....... *A47J 37/0754* (2013.01); *A47J 37/0759* (2013.01); *A47J 37/0763* (2013.01)

(58) Field of Classification Search
   CPC . A47J 37/0754; A47J 37/0759; A47J 37/0763
   See application file for complete search history.

(56) References Cited

U.S. PATENT DOCUMENTS

| | | |
|---|---|---|
| 1,055,311 A | 3/1913 | Blount |
| 1,836,101 A | 8/1927 | Young |
| 2,623,234 A | 12/1952 | Brown |
| 3,343,199 A | 1/1967 | Nolte |
| 4,342,131 A | 8/1982 | Reid |
| 4,416,248 A | 11/1983 | Schlosser |
| 4,593,676 A | 6/1986 | Wackerman |
| 4,686,957 A | 8/1987 | Koziol, III |
| 4,797,072 A | 1/1989 | Berfield et al. |
| 4,868,949 A | 9/1989 | Loveless et al. |
| 4,895,134 A | 1/1990 | Fielding et al. |
| 4,922,583 A | 5/1990 | Wentworth |
| 4,953,255 A | 9/1990 | Jenkins |
| 5,035,516 A | 7/1991 | Pacheco |
| 5,036,832 A | 8/1991 | Schlosser et al. |
| 5,054,159 A | 10/1991 | Richardson |
| 5,154,159 A | 10/1992 | Knafelc et al. |
| 5,323,760 A | 6/1994 | Johnson |
| 5,471,916 A | 12/1995 | Bird et al. |
| 5,925,193 A | 7/1999 | Bude et al. |

(Continued)

FOREIGN PATENT DOCUMENTS

| | | |
|---|---|---|
| FR | 2950676 | 4/2011 |
| GB | 2365322 A | 2/2002 |
| KR | 200449619 | 7/2010 |

*Primary Examiner* — Marc Carlson
(74) *Attorney, Agent, or Firm* — Derek Fahey

(57) ABSTRACT

A system for cleaning an enclosed bar-b-que. A first adapter is configured to attach to a first opening of the enclosed bar-b-que such that when the first adapter is attached to the first opening air flows through a first channel into the enclosed bar-b-que. The first adapter is configured for allowing an air blowing device to connect to the first adapter such that the air blowing device forces air to flow in a first direction through the enclosed bar-b-que and out of a second opening of the enclosed bar-b-que. A second adapter configured to attach to the second opening such that when the second adapter is attached to the second opening air and matter flow through the second channel and out the enclosed bar-b-que. A receiving element is attached to the second adapter for receiving air and matter blown from inside the enclosed bar-b-que and out of the second opening.

19 Claims, 4 Drawing Sheets

(56) References Cited

U.S. PATENT DOCUMENTS

| | | | |
|---|---|---|---|
| 5,996,572 A * | 12/1999 | Ilagan | A47J 37/0786 |
| | | | 126/21 A |
| 6,098,229 A | 8/2000 | Ward | |
| 6,155,248 A * | 12/2000 | Schlosser | A47J 37/0786 |
| | | | 126/242 |
| 6,318,356 B1 | 11/2001 | Stephen et al. | |
| 7,637,258 B2 | 12/2009 | Cosgrove | |
| 8,528,160 B2 | 9/2013 | Conrad | |
| 9,282,860 B2 * | 3/2016 | Brison | A47L 7/0071 |
| 10,070,755 B2 * | 9/2018 | Schlosser | A47J 37/0786 |
| 10,517,427 B2 * | 12/2019 | Hackley | A47J 37/0786 |
| 2003/0147566 A1 | 8/2003 | Brocking | |
| 2006/0124120 A1 * | 6/2006 | Gross | A47J 37/079 |
| | | | 126/25 B |
| 2006/0157046 A1 * | 7/2006 | Na | A47J 37/0709 |
| | | | 126/25 R |
| 2008/0141997 A1 * | 6/2008 | Druin | A47J 36/38 |
| | | | 126/39 BA |
| 2010/0258106 A1 * | 10/2010 | Simms, II | A47J 37/0704 |
| | | | 126/25 R |
| 2012/0012096 A1 * | 1/2012 | Cusack | A47J 36/12 |
| | | | 126/312 |
| 2014/0068892 A1 | 3/2014 | Chambers | |
| 2014/0224241 A1 * | 8/2014 | McCary | A47J 37/0704 |
| | | | 126/25 R |
| 2016/0095491 A1 | 4/2016 | Donaghy | |
| 2016/0174766 A1 * | 6/2016 | Schlosser | A47J 37/0718 |
| | | | 126/25 R |
| 2017/0215641 A1 * | 8/2017 | DeBruler | A47J 37/0763 |
| 2017/0238761 A1 * | 8/2017 | Jungmeyer | A47J 37/0704 |
| 2018/0056338 A1 * | 3/2018 | Fleming | B08B 1/005 |
| 2019/0335948 A1 * | 11/2019 | Reales Bertomeo | |
| | | | A47J 37/0786 |

\* cited by examiner

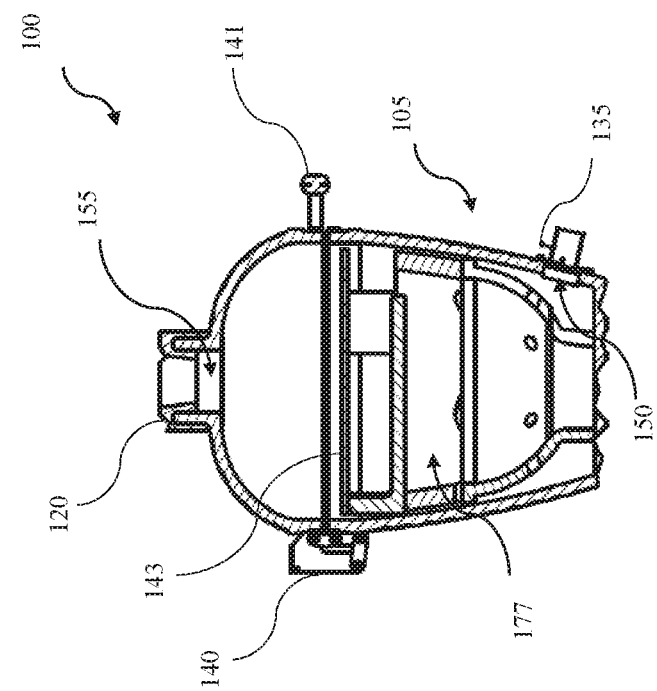
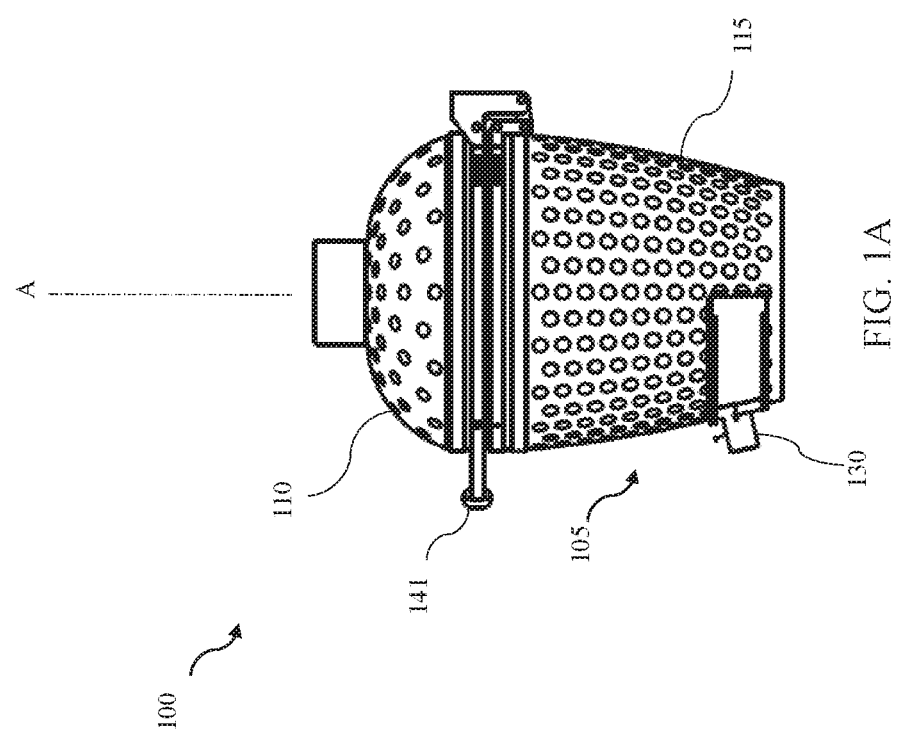
FIG. 1A
FIG. 1B

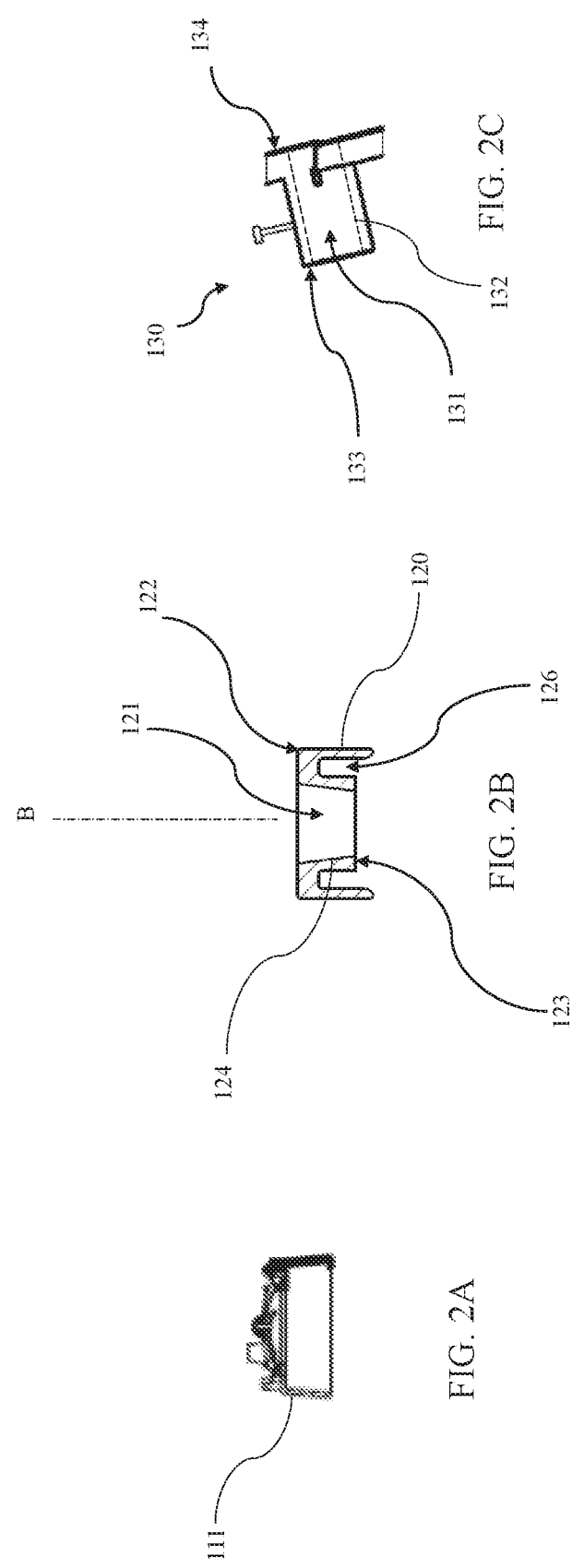

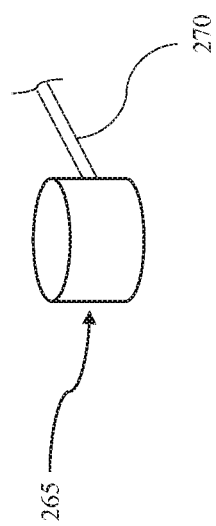

SYSTEM FOR CLEANING AND ENCLOSED BAR-B-QUE

CROSS-REFERENCE TO RELATED APPLICATIONS

Not applicable.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The present invention relates to the field of bar-b-que, and more specifically to the field of cleaning bar-b-ques.

BACKGROUND

The outdoors is loved by many people throughout the world. Many people also enjoy cooking outdoors. Barbecue or barbeque (informally BBQ or barbie) is both a cooking method and an apparatus/machine. Barbecuing is done slowly over low, indirect heat and the food is flavored by the smoking process, while grilling, a related process, is generally done quickly over moderate-to-high direct heat that produces little smoke.

One type of cooking apparatus used for barbecuing is the kamado or ceramic grill/smoker/oven or with other types of enclosed ovens. The kamado grill or oven is a type of enclosed oven or grill and is a fast-growing category with more and more choices and types of enclosed ovens and grills available for consumers every year. In many cases enclosed ovens and grills are charcoal fueled devices are modem versions of the Japanese kamado, an earthenware cooking urn whose original design is probably at least 3,000 years old.

In many cases enclosed oven and grills are basically an enclosed oven with a removable lid. Cookers, enclosed ovens and grills are now made from a variety of materials including high fire ceramics, refractory materials, double wall insulated steel, traditional terra cotta, and a mix of Portland cement and crushed lava rock. Outer surfaces also vary from a high gloss ceramic glaze, paint, a textured stucco-like surface and ceramic tiles.

In many cases, enclosed ovens and grills are generally fueled by charcoal. Because the enclosed ovens and grills are fueled by charcoal they must be frequently cleaned to remove the soot, ash and other debris from the grill after use. This can be a very time-consuming process. Currently, there is no efficient way for enclosed ovens and grills and other enclosed bar-b-ques. Many times, because there is no efficient or effective way of cleaning enclosed ovens, grills and bar-b-ques, many people decide not to use them, which may lead to a decrease in the number of enclosed ovens, grill and bar-b-ques needed in the market and may also lead to health-related problems associated with leaving soot and ash from used charcoal.

As a result, there exists a need for improvements over the prior art and more particularly for a more efficient way of cleaning enclosed grills, ovens and bar-b-ques used for cooking.

SUMMARY

A system for cleaning an enclosed bar-b-que is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a system for cleaning an enclosed bar-b-que is disclosed. The system includes a first adapter having a first channel configured to attach to a first opening at a first location of the enclosed bar-b-que such that when the first adapter is attached to the first opening air flows through the first channel into the enclosed bar-b-que. The first adapter is configured for allowing an air blowing device to connect to the first adapter such that when the air blowing device is connected to the first adapter the air blowing device is configured to force air to flow in a first direction through the enclosed bar-b-que and out of a second opening at a second location of the enclosed bar-b-que. A second adapter having a second channel is configured to attach to the second opening such that when the second adapter is attached to the second opening air and matter flow through the second channel and out the enclosed bar-b-que. A receiving element is attached to the second adapter for receiving air and matter blown from inside the enclosed bar-b-que and out of the second opening.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein:

FIG. 1A is a side view of an enclosed bar-b-que, according to an example embodiment:

FIG. 1B is a side cross sectional view of the enclosed bar-b-que, according to an example embodiment;

FIG. 2A is a side view of a lid of the enclosed bar-b-que, according to an example embodiment;

FIG. 2B is a side cross sectional view of a first adapter of the enclosed bar-b-que, according to an example embodiment;

FIG. 2C is a side view of a second adapter of the enclosed bar-b-que, according to an example embodiment;

DETAILED DESCRIPTION

Figure 3B:
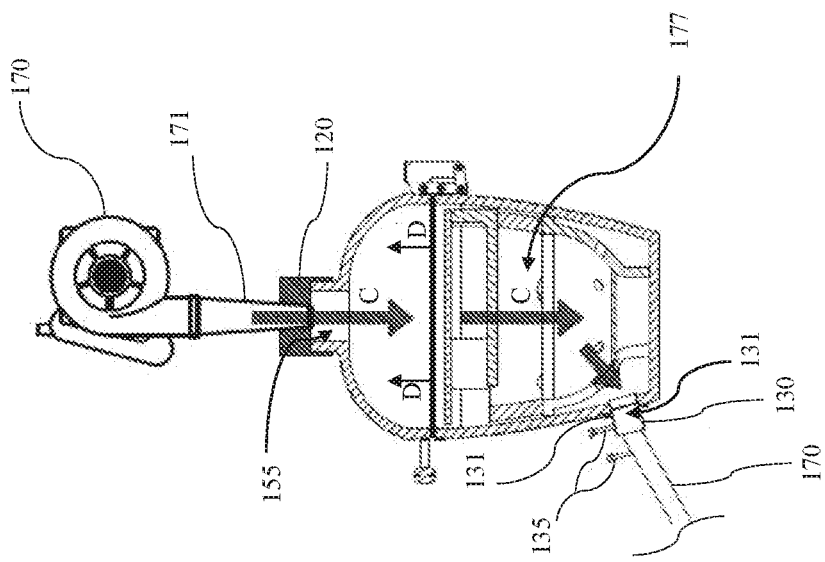
FIG. 3B is a partial side cross sectional view of the enclosed bar-b-que having the air blowing device attached thereto, according to an example embodiment; and, FIG. 3C is a perspective view of a container having a hose connected thereto, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a system for cleaning an enclosed bar-b-que more efficiently, quickly and effectively. It is understood that the term "enclosed bar-b-que", "enclosed bar-b-que grill", "bar-b-que grill" "enclosed barbecue grill", "barbecue grill" and "enclosed oven" may be used interchangeable throughout the application and are meant to incorporate a large amount of enclosed cooking apparatus. The system provides a cleaning system that is easy to use and easy to remove the waste from the bar-b-que. The air blowing device makes it easy to rapidly clean the enclosed bar-b-que grill. Additionally, a receiving element, which may be a bag, container, or any other item for storing dirt or soot, conveniently stores dirt and soot for easy disposal. Also, in certain embodiments, a vacuum or other device, may also be used in attachment with the receiving element to increase the system's ability to collect dirt and soot. Additionally, venturi tubes may be used to increase the flow dirt into the container, which increases the efficiency of the system.

Referring now to the Figures, FIG. 1A is a side view of an enclosed bar-b-que, according to an example embodiment. The enclosed bar-b-que may be a kamado grill, a Green Egg™, a cooker, an enclosed bar-b-que grill, cooker and other types of enclosed ovens. However, other enclosed cookers, grills or ovens may also be used and are within the spirit and scope of the present invention. FIG. 1B is a side cross sectional view of the enclosed bar-b-que 105, according to an example embodiment. FIGS. 1A and 1B will be discussed together.

The system 100) includes an enclosed bar-b-que 105 may include a top portion 110 connected by a hinging element 140) to a bottom portion 115. In operation, a user would lift the top portion or lid using the handle 141 to have access to the cooking surface 143 inside the enclosed grill. It is also understood that top portion does not have to be connected to the bottom portion by a hinged element. Other means for connecting a top portion to the bottom portion may be also used and are within the spirit and scope of the present invention. In other embodiments, the top portion is not connected to the bottom portion and may be a removable lid. Typically, the top portion will have an opening 155 or air vent for air and smoke flowing out of the top portion of the bar-b-que grill. In many embodiments, the opening 155 may be covered by a lid 111 (FIG. 2A illustrates the lid) that may also include smaller openings. The smaller openings may be adjustable or have an apparatus for adjusting the air flow and air that flows through the grill. Typically, the lid may be removable from the top portion providing access to the opening 155 on the top portion of the enclosed bar-b-que grill.

The lower portion may also include a second opening 150 that may be covered by a door thereby providing a draft door. The second opening and door also act as a vent that may be used for controlling the flow of air within the enclosed bar-b-que. Using the vent system, that may include the lid covering the first opening and the draft door covering the second opening, precise control of airflow can be maintained, allowing enclosed grills to function much like wood-fired ovens and they can be used to roast or bake anything.

The present embodiments, similar to many enclosed bar-b-que, may be comprised of ceramics. The use of ceramics has many advantages over other materials, mainly the excellent heat retention. However, other materials may be used and are within the spirit and scope of the present invention. The components of the top portion and bottom portions may be formed from a single piece or from several individual pieces joined or coupled together. The components of the top portion and bottom portion may be manufactured from a variety of different processes including an extrusion process, a mold, welding, shearing, punching welding, folding etc.

The system includes a first adapter 120. FIG. 2B is a side cross sectional view of a first adapter of the enclosed bar-b-que, according to an example embodiment. The first adapter is configured to covert the first opening of the top portion to be able to receive the hose portion (see 171 in FIG. 3B) of an air blowing device. The first adapter has a first channel 121. The first adapter is configured to attach to a first opening such that when the first adapter is attached to the first opening air flows through the first channel into the enclosed bar-b-que. In the present embodiment, the first channel has a tapered cross-sectional diameter to provide a seal for a variety of hoses or components of an air blowing device when an air blowing device 170 is attached, connected or abutted to the first adapter. The wall 124 of the channel defines the tapered cross-sectional diameter of the first channel. The first channel has a cross-sectional diameter at the top end 122 of the adapter that is greater than the cross-sectional diameter at the lower end 123 of the first adapter. As illustrated in FIG. 3B, in operation, the tapered cross-sectional of the first channel of the first adapter is such that a seal is formed between the hose like component 171 of the air blowing device is inserted into the first channel.

The first adapter also defines a groove 126 that is configured for receiving the portion of the top portion of the enclosed bar-b-que grill that receives the lid. The first adapter may comprise material capable of creating a seal with an air blowing device. In one embodiment, the first adapter may comprise material such as rubber. However, in other embodiments, other materials such as wood, metals, alloys, composites, ceramics, polymeric materials or any combination thereof may also be used. The first adapter may be formed from a single piece or from several individual pieces joined or coupled together. The first adapter may be manufactured from a variety of different processes including via a CNC lathe, extrusion, a mold, welding, shearing, punching welding, folding etc. In operation of the system, the first adapter would be attached to the top portion of the grill after the lid 111 was removed and when the grill is not in operation.

In the present embodiment, the first channel has a first longitudinal axis (represented by line B) in line with a second longitudinal axis (represented by line A) of a top portion of the enclosed bar-b-que. However, it is understood that the longitudinal axis of the first channel may also be adjusted so long as the channel of the first adapter is configured for allowing an air blowing device to connect to the first adapter such that when the air blowing device is connected to the first adapter the air blowing device is configured to force air to flow in a first direction through the enclosed bar-b-que and out of a second opening 150 at a second location of the enclosed bar-b-que. In the present embodiment, the first direction (represented by arrow C) of the air flow is opposite a normal operational air flow of the enclosed bar-b-que. In operation, because of thermodynamics, hot air will rise as it moves from the heat source through the enclosed bar-b-que. The terms opposite or opposing a normal operational air flow may also be such that the first direction may be against the normal air operational air flow of escaping gas of the enclosed bar-b-que (represented by arrow D).

The air blowing device 170 may be a variety of types of devices. The air blowing device may be a leaf blower, a vacuum configured to blow instead of pulling air, a motor configured to blow air, or any other device configured to force air in a certain direction with a relatively high amount of force. However, other air blowing devices may also be used and are within the spirit and scope of the present invention. The air blowing device may comprise a lower part 171 that is a tubular shaped body, tube, hose or pipe that is configured for emitting or blowing air outward at with relatively high force. The tapered shape of the cross-sectional diameter of the first channel 121 is such that is configured for receiving a large amount of different sizes of tubular sections of the air blowing devices and to create a seal such that a maximum amount of air moves into the enclosed bar-b-que.

The system 100 also includes a second adapter 130 that has a second channel 131 that allows air to move through from the first end 133 of the adapter to the second end 134 of the adapter. The second adapter is configured to attach to the second opening 150 such that when the second adapter is attached to the second opening the second adapter allows air and matter to flow through the second channel and out the enclosed bar-b-que. In certain embodiments, the user may be required to remove portions of the door proximate to the second opening before attaching the second adapter to the second opening. The second adapter comprises at least a walled section 132 that defines the second channel so that air may flow through the second adapter. The second opening may be an opening that is typically covered by a vent door that is a component of the venting system. In operation, the second adapter may operate as an adapter to convert the second opening to receive a hose 170, conduit, container, sleeve or another receiving element at the second end of the second adapter. The second adapter may be configured for having fasteners for attaching the hose, conduit or receiving elements to the second adapters. Each of the fasteners may include a suction cup, hooks, bolt, set crews, opening configured to attached to protruding element, socket screws u-bolts, twine, etc. However, other types of fasteners may also be used and are within the spirit and scope of the present invention.

When attached to the second opening, the second adapter may be shaped such that when the door that covers the second opening is opened or removed the adapter allows air to flow out of second opening into and into a hose element, container or conduit that may be attached to the second adapter. In one embodiment, the second adapter may comprise material such as rubber. However, in other embodiments, other materials such as wood, metals, alloys, composites, ceramics, polymeric materials or any combination thereof may also be used. The second adapter may be formed from a single piece or from several individual pieces joined or coupled together. The second adapter may be manufactured from a variety of different processes including via a CNC lathe, extrusion, a mold, welding, shearing, punching welding, folding etc. In operation of the system, the second adapter would be attached to the bottom portion of the grill after the lid 111 was removed and when the grill is not in operation.

Figure 3A:
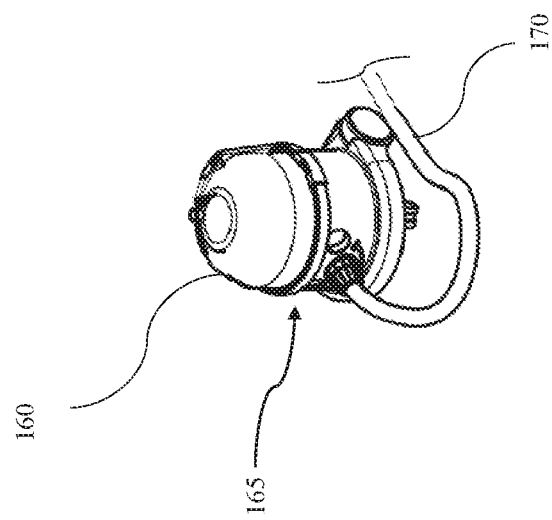
FIG. 3A is a perspective view of an air pulling device and container having a hose connected thereto, according to an example embodiment.

The system also includes a receiving element 165 that is attached to the second adapter for receiving air and matter blown from inside the enclosed bar-b-que and out of the second opening. As illustrated in FIG. 3A in one embodiment, the receiving element may be a vacuum 160 or shop vac. The receiving element may be an air pulling device or vacuum 160 in fluid communication facilitate to pull air and debris from inside the enclosed bar-b-que and into the receiving element. The vacuum may be a vacuum having a port for attaching a hose 170 that allows dirt, air and debris to move into a container within the vacuum. As illustrated in FIG. 3C, in another embodiment, the receiving element 265 may a bag or container connected to the second opening by a conduit 270 configured for housing debris without a motor for pulling air out through the second opening of the enclosed bar-b-que. Additionally, the system may be configured such that the second adapter has a second side that is configured for connecting to a plurality of different types of the terminating ends of hoses for vacuums.

In one embodiment, the system includes at least one venturi tube 135 that is in communication with the receiving element for providing an increased amount of force to move debris and matter into the receiving element. In certain embodiments, the venture tubes may comprise of a tube with a short, narrow center section and widened, tapered ends, so that a fluid flowing through the center section at a higher velocity than through an end section creates a pressure differential that is a measure of the flow of the fluid. However, other embodiments may be used to increase or control the amount of flow of the second opening and into the receiving element.

The air pulling device combined with the air blowing device moves debris from inside the enclosed bar-b-que to the receiving element at a greatly increased rate. In other embodiments, the air pulling device may not be used. The size and type of the air pulling device used may be varied depending on a variety of factors, including the size of the grill, the amount of charcoal used or charcoal debris inside the enclosed grill that the user desires to remove from inside the charcoal grill the receiving element.

Referring to FIGS. 1A-B and 3B, in operation, a user would operate the enclosed grill normally. After several uses, or in some cases a single use, soot, dirt, and used charcoal and other types of fuel may be remaining inside the inside container 177 of the enclosed barbecue grill. Next, if a user desires to efficiently clean the enclose barbecue grill, then, the system could be used. To operate the system from the fully assembled enclose barbecue grill, a user would first remove the lid 111 from the first opening 155 of the top portion. After the lid has been removed, the first adapter 120 would be attached to the top portion proximate first opening by positioning the grooves 126 of the first adapter to receive the portions of the top portion of the grill on which the lid is mounted. Next, if the system includes a second adapter 130, then the user would remove any door that covered the second opening 150. After the door covering the second opening was removed, then, the user would attach the second adapter 130 proximate to the second opening.

Next, if a receiving element is used, then the user would attach the receiving element to the second adapter 130 such that the receiving element can receive air and matter blown from inside the enclosed barbecue grill and out of the second opening. As mentioned above, in one embodiment the receiving element may be a bag or container for housing debris. In one embodiment, the bag or container may be somewhat porous such that there may flow through the bag however allowing the bag to retain dirt and other matter. For example, the receiving element may be a vacuum bag or paper bag that allows air to flow through it. However, other types of retaining elements may also be used and are within the spirit and scope of the present invention. In other embodiments, the receiving element may be a vacuum or household vacuum cleaner having a compartment for housing dirt and other matter received. In other embodiments, the receiving element may be a receiving sleeve that is configured for housing dirt and other debris while allowing air to flow through it.

Next, the user may position a blower or other air blowing device 170 such that the end of the cylindrical shape body 171 is received by the first channel 121 of the first adapter. As mentioned above, the first channel may comprise a tapered cross-sectional diameter that provides a seal between the leaf blower and the first adapter. Next, in operation, the user will turn on or activate the leaf blower or air blowing device 170 thereby forcing air through the inside of the enclosed barbecue in a first direction (represented by arrow C) at relatively great amount of force. One event a feature of the present embodiment is that the air is forced in the first direction, which is opposing or opposite the natural flow of gases (represented by line D) that occur during the operation of the enclosed barbecue.

Additionally, in certain embodiments such as illustrated in FIG. 3A, a vacuum 160 or residential vacuum may be attached at the second adapter to the second opening such that it receives debris and other matter from inside the enclosed barbecue. In the example illustrated in FIGS. 3A and 3B, the vacuum or receiving element will be used to suck air and debris in conjunction with the air blowing device 170 that blows air and debris in the direction of arrow C towards the second opening. Additional forces provided by the vacuum may provide an increased amount of cleaning and debris removal. The air blowing device provides an amount of force that is able to clean the inside of the enclosed bar-b-que with a large amount of force. After the enclosed bar-b-que has been cleaned to the satisfaction of the user, the user may remove the air blowing device 170, first adapter, second adapter and receiving element from the enclosed barbecue grill and replace the lid 111 and apparatus attached to the second opening.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A system for cleaning an enclosed bar-b-que comprising:
   a first adapter having a first channel configured to attach to a first opening at a first location proximate to a top portion of an enclosed bar-b-que, where the first location is directly above a cooking surface such that when the first adapter is attached to the first opening air flows through the first channel into the enclosed bar-b-que;
   the first adapter is configured for allowing an air blowing device to connect to the first adapter such that when the air blowing device is connected to the first adapter the air blowing device is configured to force air to flow in a first direction through the enclosed bar-b-que and out of a second opening at a second location of the enclosed bar-b-que; and,
   a second adapter having a second channel configured to attach to the second opening such that when the second adapter is attached to the second opening air and matter flow through the second channel and out the enclosed bar-b-que.

2. The system of claim 1, wherein system further includes an air pulling device in fluid communication with a receiving element to pull air from inside the enclosed bar-b-que and into the receiving element.

3. The system of claim 1, wherein the receiving element comprises a container configured for housing debris.

4. The system of claim 1, wherein the enclosed bar-b-que is a kamado style grill.

5. The system of claim 1, wherein the first direction of the air flow is directly opposite a normal operational air flow of the enclosed bar-b-que.

6. The system of claim 1, wherein the first channel has a tapered cross-section to provide a seal with an end of the air blowing device such that an air blowing device conduit of the air blowing device is inside the top portion of the enclosed bar-b-que when said air blowing device is removably attached to the top portion.

7. The system of claim 1, wherein the first channel has a first longitudinal axis in line with a second longitudinal axis of a top portion of the enclosed bar-b-que.

8. The system of claim 1, wherein the first opening is positioned on a top portion of enclosed bar-b-que.

9. The system of claim 1, wherein at least one venturi tube is in communication with the receiving element for providing an increased amount of force greater than normal air flow moving debris and matter into the receiving element.

10. A system for cleaning an enclosed bar-b-que comprising:
    an enclosed bar-b-que having a top portion defining an enclosed chamber above a cooking surface, the top portion having a first opening at a first location above the cooking surface;
    a first adapter having a first channel configured to attach to the first opening such that when the first adapter is attached to the first opening air flows through the first channel into the enclosed bar-b-que;
    where the first location is disposed on the top portion directly above the cooking surface;
    an air blowing device having an air blowing device conduit, where the air blowing device conduct is removably attachable to the first channel;
    a second adapter having a second channel configured to attach to the second opening such that when the second adapter is attached to the second opening air and matter flow through the second channel and out the enclosed bar-b-que; and, a container in communication with the second adapter for receiving air and matter blown from inside the enclosed bar-b-que and out of the second opening.

11. The system of claim 10, wherein system further includes an air pulling device in fluid communication with a receiving element to pull air from inside the enclosed bar-b-que and into the receiving element.

12. The system of claim 10, wherein the enclosed bar-b-que is a kamado style grill.

13. The system of claim 10, wherein the first channel has a tapered cross-section to provide a seal with an end of the air blowing device.

14. The system of claim 10, wherein the first channel has a first longitudinal axis in line with a second longitudinal axis of a top portion of the enclosed bar-b-que.

15. The system of claim 10, wherein the first opening is positioned on a top portion of enclosed bar-b-que.

16. The system of claim 10, wherein at least one venturi tube is in communication with the receiving element for providing an increased amount of force greater than normal air flow moving debris and matter into the receiving element.

17. A system for cleaning a bar-b-que comprising:
a first adapter having a first channel, wherein the first channel has a first longitudinal axis in line with a second longitudinal axis of a top portion of the bar-b-que;
where the first adapter is removably attached to a first opening at a first location of a top portion of a bar-b-que, where the first location is above the cooking surface; and,
wherein the first adapter configured is for allowing an air blowing device to connect to the first adapter such that when the air blowing device is connected to the first adapter the air blowing device is configured to force air to flow in a first direction opposing a normal operational air flow of the bar-b-que and out of a second opening at a second location of the bar-b-que.

18. The system of claim 17, wherein the first opening is positioned directly above the cooking surface of the bar-b-que so the first channel has a longitudinal axis that is perpendicular to and above a cooking surface of the enclosed bar-b-que.

19. The system of claim 18, wherein the air blowing device is removably attached to the first adapter, the air blowing device having an air blowing device conduit having an air blowing device conduit longitudinal axis, where the air blowing device conduit longitudinal axis is directly above and perpendicular to the cooking surface when the air blowing device is attached to the first adapter.

* * * * *